(12) United States Patent
Bouldin

(10) Patent No.: US 7,449,330 B2
(45) Date of Patent: Nov. 11, 2008

(54) BIOREACTOR VESSEL AND SHAFT ASSEMBLY

(75) Inventor: Floyd E. Bouldin, McMinnville, TN (US)

(73) Assignee: Bouldin Corporation, McMinnville, TN (US)

( * ) Notice: Subject to any disclaimer, the term of this patent is extended or adjusted under 35 U.S.C. 154(b) by 87 days.

(21) Appl. No.: 10/232,433

(22) Filed: Aug. 30, 2002

(65) Prior Publication Data

US 2004/0043480 A1    Mar. 4, 2004

(51) Int. Cl.
| | |
|---|---|
| C05F 9/02 | (2006.01) |
| B09B 3/00 | (2006.01) |
| B01J 3/00 | (2006.01) |
| B01J 3/02 | (2006.01) |
| B01F 7/04 | (2006.01) |

(52) U.S. Cl. ............ 435/290.2; 435/290.4; 435/298.1; 422/184.1; 422/299; 127/1; 366/319; 366/325.2; 366/325.92

(58) Field of Classification Search ............. 435/289.1, 435/290.2, 290.4, 291.5, 291.7, 293.1, 298.1; 241/260.1, 246, 247; 366/325.2–325.5, 322, 366/319, 310, 149, 309, 325.92, 295, 67; 422/184.1, 205, 226, 229; 127/1
See application file for complete search history.

(56) References Cited

U.S. PATENT DOCUMENTS

| | | | | |
|---|---|---|---|---|
| 1,919,878 | A * | 7/1933 | Brownlee | 549/489 |
| 3,417,485 | A * | 12/1968 | Saxon | 34/182 |
| 3,486,864 | A * | 12/1969 | Van Der Schee et al. | 422/134 |
| 3,617,313 | A * | 11/1971 | Harrington et al. | 422/266 |
| 3,930,799 | A * | 1/1976 | Eweson | 435/290.3 |
| 4,099,457 | A * | 7/1978 | Hyden | 100/42 |
| 5,376,171 | A * | 12/1994 | Frye | 106/486 |
| 5,534,437 | A * | 7/1996 | Arrau | 435/290.3 |
| 5,587,320 | A * | 12/1996 | Shindo et al. | 435/290.1 |
| 5,772,968 | A * | 6/1998 | Wolfe | 422/189 |
| 6,397,492 | B1 | 6/2002 | Malley | |

FOREIGN PATENT DOCUMENTS

| | | | |
|---|---|---|---|
| EP | 85000 A1 * | 8/1983 | |
| GB | 2278070 A * | 11/1994 | |
| JP | 59120298 A * | 7/1984 | |
| JP | 2000107730 A * | 4/2000 | |
| JP | 2001170606 A * | 6/2001 | |

* cited by examiner

*Primary Examiner*—William H Beisner
(74) *Attorney, Agent, or Firm*—Waddey & Patterson, P.C.; Phillip E. Walker; Edward D. Lanquist, Jr.

(57) ABSTRACT

A bioreactor apparatus for processing waste, comprising a cylindrical pressure vessel having an inlet end and an exit end, an internally rotating main shaft having spaced apart ends, and a plurality of paddles and agitator bars attached to and extending radially from the shaft. At least some of the plurality of paddles and/or agitator bars extend radially outward from the shaft and form a helical spiral pattern when viewed from either of the spaced apart ends.

10 Claims, 3 Drawing Sheets

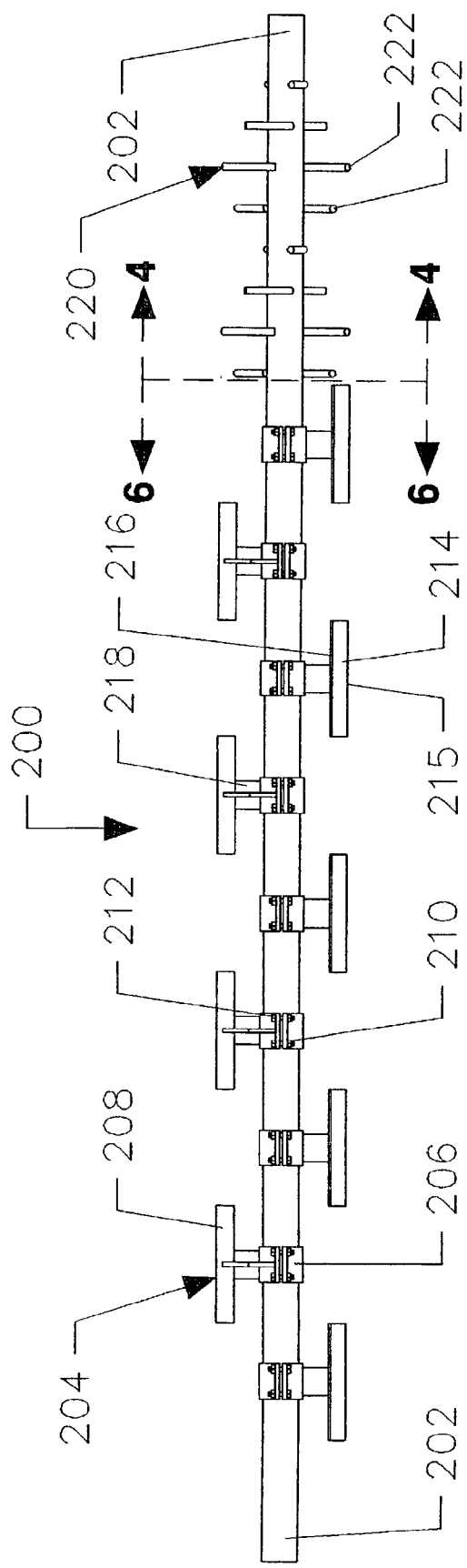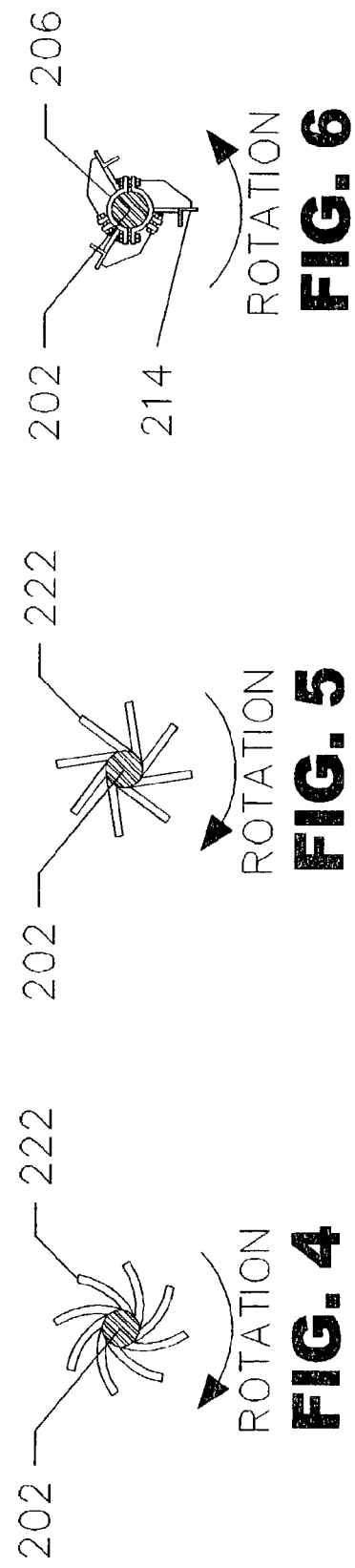

BIOREACTOR VESSEL AND SHAFT ASSEMBLY

BACKGROUND OF THE INVENTION

1. Field of the Invention

The present invention relates generally to hydrolyzers and bioreactors for processing organic material (i.e., rendering) and further relates generally to the apparatuses used for the rendering of animal carcasses or parts thereof into useful end products such as bone or feather meal. In addition, the present invention has proven particularly useful for processing (i.e., rendering) municipal solid waste even though the material characteristics of municipal solid waste and the rendering of animal carcass parts is distinctly different.

The present invention is primarily directed to a pressure vessel apparatus in the general nature of a hydrolyzer or bioreactor used for the reduction, decomposition, destruction and/or conversion (hereinafter "rendering") of organic wastes generated during meat and poultry production for human consumption.

2. Description of the Related Art

Carcass disposal at meat and poultry farms is an important environmental issue. Some of the standard methods, such as burial and incineration, no longer meet the needs of operators or existing regulations. For example, prompted by recent water and air quality regulations, the poultry industry in some states and countries is giving carcass disposal top priority by supporting efforts to promote and adopt alternative disposal methods. One environmentally sound alternative for the disposal of dead birds is conventional rendering. Rendering is a reclamation process designed to recover almost 100 percent of all inedible raw poultry material and render it useful.

Rendering is a heating process that extracts usable ingredients, such as protein meals and fats. Rendering has been used for many years to convert the inedible results from the slaughtering process into meat meal, bone meal, and feather meal—all of which are highly valued as animal feed ingredients. Today, rendering plants supply 85 percent of all fats and oils used in the United States and export 35 percent of the fats and oils used worldwide. The rendering plant is a vital link between the meat and poultry grower and industries which use fats and oils.

The rendering industry relies on the hydrolyzer or bioreactor apparatus as the cooking vessel to perform the actual rendering process. However, these conventional hydrolyzer and bioreactor apparatuses which are commonly used as the cooking vessel in the rendering industry do not work when attempting to render various wastes such as municipal solid waste ("MSW"). These conventional vessels are prone to repaeted and continuous clogging when trying to process watse material such as MSW and thus require repeated down time intervals and disassembly to empty the interior of the vessel.

Municipal solid waste disposal can be generally defined as the disposal of normally solid or semi-solid materials resulting from human and animal activities that are useless and unwanted and not hazardous or toxic. Solid wastes may be further classified in the following manner: "garbage" which is decomposable wastes from food; "rubbish" which is decomposable wastes, either combustible (such as paper, wood, and cloth) or non-combustible (such as metal, glass, plastics and ceramics).

It has become known that the traditional rendering devices such as bioreactor and hydrolyzers do not work with all materials and fail miserably when trying to process MSW. Similarly, the know how associated with conventional rendering processes is not applicable to a processing of certain wastes such as MSW in a similar manner. Until now, a suitable hydrolyzer or bioreactor for sustained continuous flow and rendering of raw wastes such as MSW has not been invented.

SUMMARY OF THE INVENTION

The preferred embodiment of the present invention is an improved bioreactor designed to metamorphically process a volume of raw waste such as municipal solid waste on a continuous basis. Like a hydrolyzer, the inventive bioreactor includes an outer containment vessel having an exterior jacket and an interior pressure vessel. An airspace exists between the interior vessel and the jacket. A heated steam inlet and exit are attached to the jacket and communicate with the air space. Therefore, the preferred bio-reactor is similar in appearance to a conventional hydrolyzer used in the rendering industry, but similarities end there.

The preferred embodiment of the bioreactor vessel of the present invention can be summarized in a variety of ways, one of which is the following: a bioreactor apparatus for processing municipal solid waste, comprising a cylindrical pressure vessel having an inlet end and an exit end, an internally rotating main shaft having spaced apart ends, a plurality of paddles attached to and extending radially from the shaft, and at least some of the plurality of paddles extending radially outward from the shaft also form a helical spiral pattern when viewed from either of the spaced apart ends.

A plurality of agitator bars is supported by and extending from the main shaft. The at least some of the plurality of paddles extend radially outward from the shaft and form a helical spiral pattern on less than the entire length of the shaft. Similarly, the plurality of agitator bars supported by and extending from the main shaft extend radially outward from the shaft and form a helical spiral pattern on less than the entire length of the shaft. In the preferred embodiment the agitator bars form a helical pattern and are positioned nearer to the inlet end of the vessel rather than the exit end of the vessel. Similarly, the paddles forming the helical pattern are positioned nearer to the exit end of the vessel rather than the inlet end of the vessel. The at least some of the plurality of paddles and plurality of agitator bars extend radially outward from the shaft and form a helical spiral pattern along the entire length of the shaft.

The inventive bioreactor can also be summarized as follows: a bioreactor for hydrolyzing municipal solid waste, comprising a pressure vessel having an inlet end and an exit end, an internal main shaft having spaced apart ends and a plurality of paddles attached to and extending from the shaft, and at least some of the plurality of paddles extending from the shaft also form a helical spiral pattern when viewed from either of the spaced apart ends.

The preferrd bioreactor may also be summarized as follows: a bioreactor for hydrolyzing municipal solid waste, comprising a pressure vessel having an inlet end and an exit end, an internal main shaft having spaced apart ends, a plurality of paddles attached to and extending from the shaft, a plurality of agitator bars attached to and extending from the shaft, and at least some of the plurality of agitator bars extending from the shaft form a helical pattern when viewed from either of the spaced apart ends.

The plurality of paddles supported by and extending from the main shaft extend radially outward from the shaft and form a helical spiral pattern on less than the entire length of the shaft. In the preferred embodiments the plurality of paddles forming the helical pattern are positioned nearer to the exit end of the vessel rather than the inlet end of the vessel.

In the preferred embodiments the agitator bars forming the helical pattern are positioned nearer to the inlet end of the vessel rather than the exit end of the vessel, form an angle less than ninety degrees with the main shaft.

BRIEF DESCRIPTION OF THE DRAWINGS

FIG. 3 is an elevated perspective view of the shaft assembly of FIG. 2;

FIG. 4 is an end view of the shaft assembly taken as viewed in the direction of line 4-4 of FIG. 3;

FIG. 5 is an end view of an alternate embodiment of the shaft assembly taken as viewed in the direction of line 4-4 of FIG. 3; and FIG. 6 is an end view of an alternate embodiment of the shaft assembly taken as viewed in the direction of line 6-6 of FIG. 3.

DETAILED DESCRIPTION OF THE PREFERRED EMBODIMENT(S)

The preferred embodiment of the inventive apparatus is shown in FIGS. 1-6.

Figure 1:
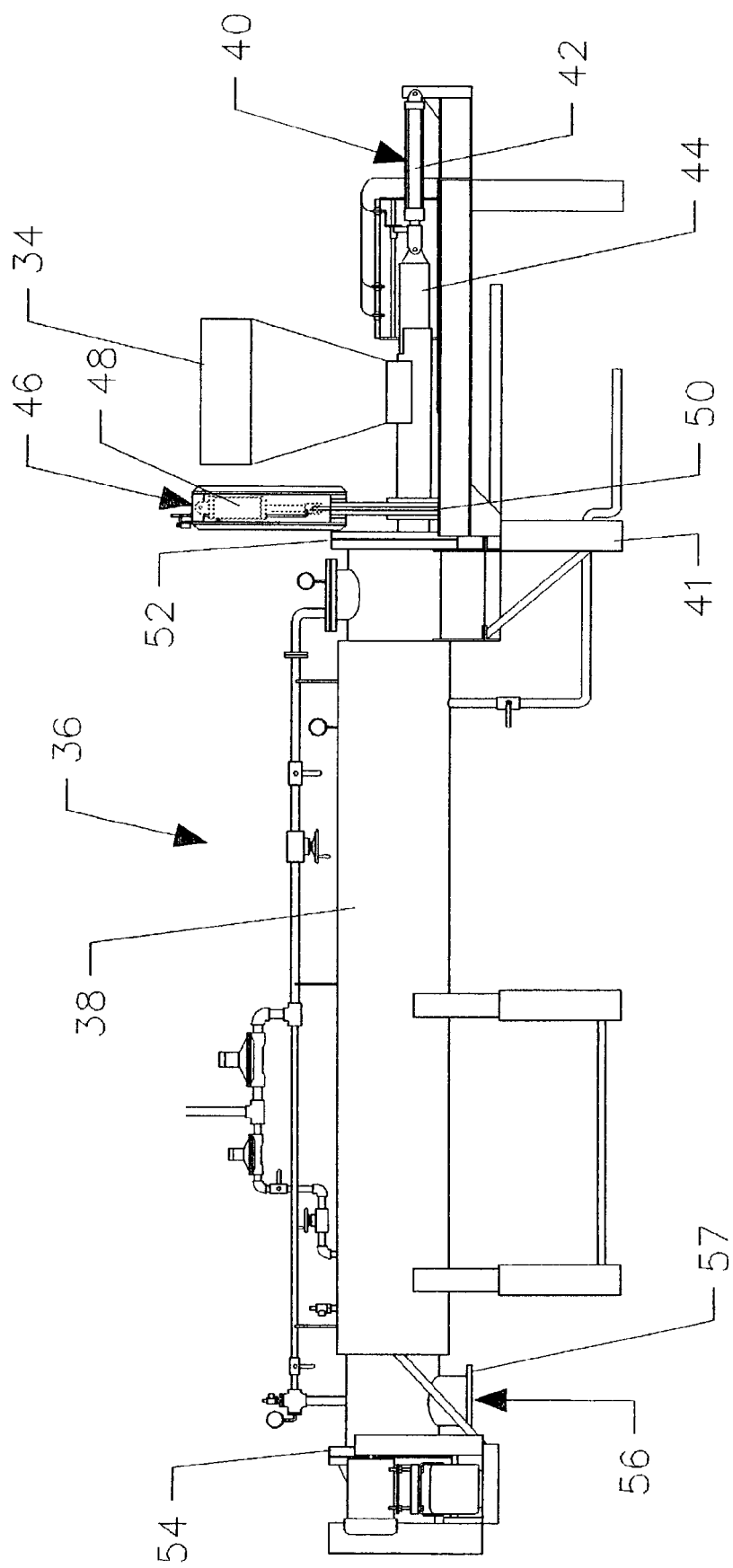
FIG. 1 is a side view of an embodiment of the preferred bioreactor of the present invention.
Figure 2:
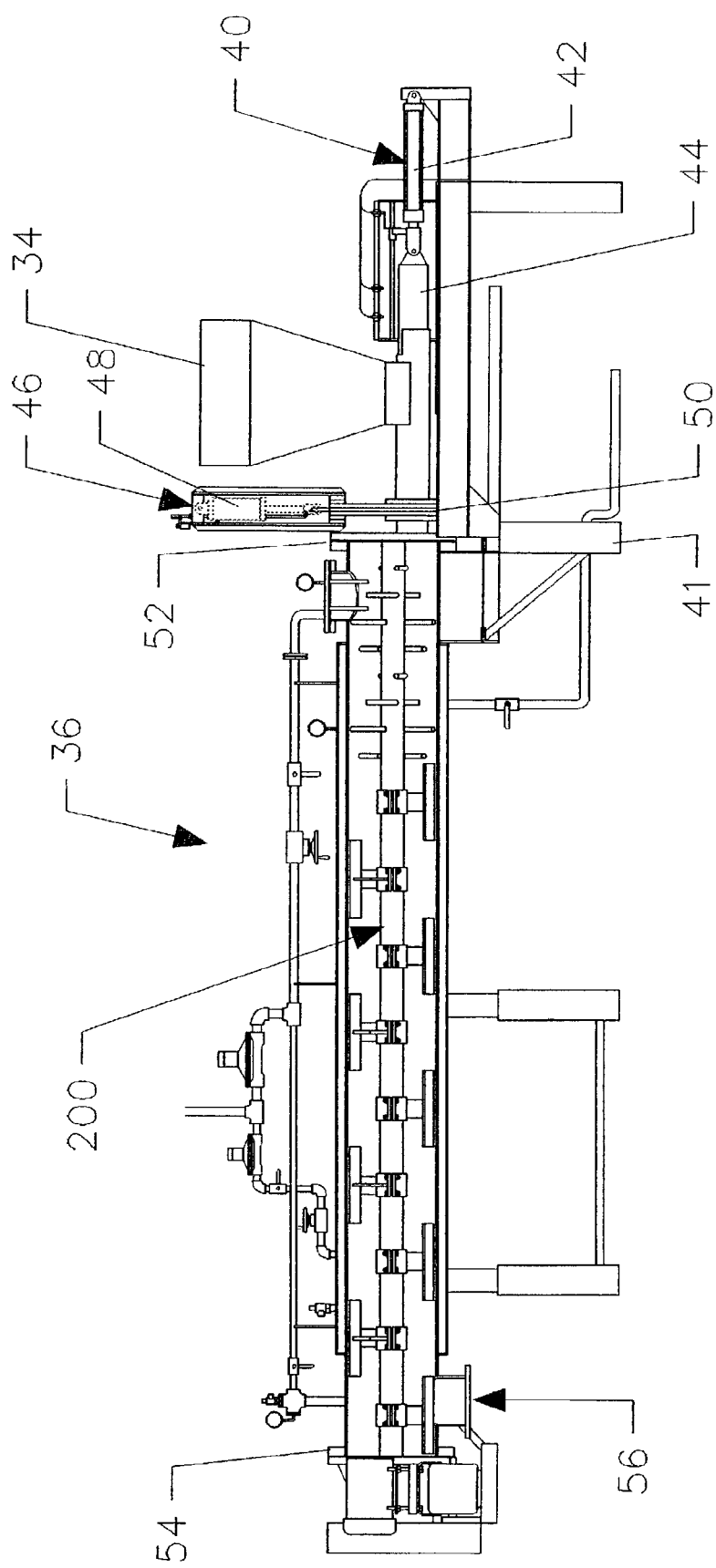
FIG. 2 is a partially cutaway side view of the bioreactor shown in FIG. 1.

With specific reference to FIGS. 1 and 2 an embodiment of the inventive bioreactor apparatus is designated generally by the reference numeral 36 and includes a cylindrical pressure vessel 38, a material injection assembly designated generally by the reference numeral 40 all of which is supported by a platform 41.

Material injection assembly 40 further includes a pneumatic or hydraulic cylinder 42 operably connected to a ram 44 positioned beneath a material infeed hopper 34. An infeed gate assembly is also provided and is designated generally by the reference numeral 46 (see FIG. 2). The gate assembly 46 includes a vertically oriented pneumatic or hydraulic cylinder 48 operably connected to a sliding gate plate 50 which opens and closes an internal passageway into the bioreactor 38 at an inlet end 52 opposite the exit end 54 which has further includes an exit port 56 with attachment collar 57.

With reference to FIGS. 2 and 3, inventive bioreactor 36 includes a spindled shaft designated generally by the reference numeral 200. Shaft 200 includes an elongated main shaft portion 202, and a plurality of paddles designated generally by the reference numeral 204 extending outwardly therefrom. Paddles 204 are secured to the main shaft 202 by clamping members 206 which are secured to the main shaft 202 by nut and bolt fasteners 210 and 212.

Wiper blade assemblies 208 are attached to and extend from the clamping members and further include blade segments 214 (FIG. 6) having a leading edge 215 and trailing edge 216 (FIG. 3) which are adjacent the pedestal 218 from which they portend. As can be seen in FIG. 3, the blade segment 214 has an elongated length and a narrow depth. As can be seen in FIGS. 3 and 6, the blade segment 214, although substantially in line with the shaft 202 in the view shown in FIG. 2, is slightly out of line with the shaft 202 when viewed from the end of the shaft in FIG. 6 or in the plan view. In addition to the paddles 204, a portion of the main shaft 202 is fitted with a plurality of agitator bars designated generally by the reference numeral 220. Each agitator bar 222 comprises of an elongated, circular in cross-section, steel bar secured to the shaft 202 by some rigid form of attachment (e.g., welding them directly to the shaft or bolting them thereto like the paddles 204).

In the preferred embodiment, the paddle assemblies 204 and agitator bars 222 are secured to the main shaft 202 in such a way as to form a helical pattern along the length of the shaft by the placement of adjacent individual paddle assemblies or bars. The helical pattern is depicted in FIGS. 4-6 with respect to the agitator bars 222 and also the paddle assemblies 204 (FIG. 3) by merely offsetting the attachment of each paddle assembly by some circular angle, as compared to any adjacent paddle assembly, and attaching adjacent agitator bars in much the same angular displacement. This helical pattern has proven extremely useful in moving the material from the inlet end of the bioreactor to the exit end without clogging the bioreactor irrespective of the nature of the material input.

With reference to FIGS. 4 and 5, the agitator bars 222 form an angle, preferably less than ninety degrees with the main shaft 202. Similarly, with respect to FIG. 6 the paddle assemblies 204 are radially spaced apart to form a helical pattern. The helical pattern may extend along a portion or the entire length of the main shaft 202 for either or both of the agitator bars 222 and paddle assemblies 204 depending upon the material inside the bioreactor and the desired rate of throughput from the inlet end to the exit end. As can be seen in FIG. 4, the agitator bars 222 can be curved so that the distal end lags the point of attachment to shaft 202.

A shaft having a full helix pattern and combination of paddles and bars has proven most effective at moving material through the bioreactor from inlet to exit and allowing the material adequate resident time within the bioreactor in order to ensure complete processing of the material. In addition to the material movement advantages of the helical pattern of the paddles and bars, the helical pattern enables the bioreactor to be self-cleaning and prevents clogging.

What is claimed is:

1. A bioreactor for hydrolyzing waste, comprising:
a pressure vessel having an inlet end and an exit end;
an internal main non-vertical shaft having spaced apart ends and a plurality of agitator bars attached to and extending from the shaft;
at least some of the agitator bars extending from the shaft also form a helical spiral pattern when viewed from either of the spaced apart ends, wherein at least some of the agitator bars are curved;
a plurality of paddles supported by and extending from the main shaft, wherein at least some of the plurality of paddles extend radially outward from the shaft and form a helical spiral pattern on less than the entire length of the shaft, the helical spiral pattern formed by some of the plurality of paddles is positioned to move the waste toward the exit end in a direction substantially parallel with the length of the shaft;
at least one paddle comprises a pedestal attached to the shaft having a pedestal length and a paddle blade having a paddle blade length extending substantially parallel to the shaft, wherein the paddle blade length is greater than the pedestal length;
a material injection assembly connected by an internal passageway to the inlet end of the pressure vessel and including a ram; and
a vertically oriented sliding gate disposed between the inlet end and the material injection assembly.

2. The bioreactor of claim 1, wherein: the plurality of paddles forming the helical pattern are positioned nearer to the exit end of the vessel rather than the inlet end of the vessel.

3. The bioreactor of claim 1, wherein: the agitator bars forming the helical pattern are positioned nearer to the inlet end of the vessel rather than the exit end of the vessel.

4. The bioreactor of claim 1, wherein: the at least some of the plurality of paddles and plurality of agitator bars extend radially outward from the shaft and form a helical spiral pattern along the entire length of the shaft.

5. A bioreactor for hydrolyzing municipal solid waste, comprising:
   a pressure vessel having an inlet end and an exit end; an internal main shaft having spaced apart ends; wherein the shaft is not vertical;
   a plurality of paddles attached to and extending from the shaft wherein each paddle comprises an attachment end portion proximate the shaft and separated from a distal end portion opposite the attachment end portion by a pedestal having a pedestal length, the distal end portion including a paddle blade including a substantially elongated length positioned substantially parallel to the shaft, the substantially elongated length greater than the pedestal length;
   a plurality of agitator bars attached to and extending from the shaft, at least one of the agitator bars being joined to the main shaft at an axial angle other than ninety degrees; and
   at least some of the plurality of agitator bars extending from the shaft form a helical pattern when viewed from either of the spaced apart ends.

6. The bioreactor of claim 5, wherein: the at least some of the plurality of paddles extend radially outward from the shaft and form a helical spiral pattern on less than the entire length of the shaft.

7. The bioreactor of claim 5, wherein: the plurality of paddles supported by and extending from the main shaft extend radially outward from the shaft and form a helical spiral pattern on less than the entire length of the shaft.

8. The bioreactor of claim 7, wherein: the plurality of paddles forming the helical pattern are positioned nearer to the exit end of the vessel rather than the inlet end of the vessel.

9. The bioreactor of claim 5, wherein: the agitator bars forming the helical pattern are positioned nearer to the inlet end of the vessel rather than the exit end of the vessel.

10. The bioreactor of claim 5, wherein: at least some of the agitator bars are curved.

* * * * *